United States Patent
Yang et al.

(10) Patent No.: US 8,363,305 B2
(45) Date of Patent: Jan. 29, 2013

(54) FULL COLOR ELECTROPHORETIC DISPLAY DEVICE

(75) Inventors: Jiun-Yan Yang, Zhubei (TW); Jian-Min Leu, Zhongli (TW)

(73) Assignee: Chimei Innolux Corporation, Chu-Nan (TW)

( * ) Notice: Subject to any disclaimer, the term of this patent is extended or adjusted under 35 U.S.C. 154(b) by 0 days.

(21) Appl. No.: 13/038,800

(22) Filed: Mar. 2, 2011

(65) Prior Publication Data
US 2011/0286078 A1    Nov. 24, 2011

(30) Foreign Application Priority Data
May 18, 2010   (TW) ............................... 99115765 A

(51) Int. Cl.
*G02B 26/00* (2006.01)
*G09G 3/34* (2006.01)
(52) U.S. Cl. ........ 359/296; 359/253; 345/107; 345/690; 345/214; 349/106
(58) Field of Classification Search .................. 359/252, 359/253, 296; 345/55, 76, 106–108, 205, 345/214, 690, 691; 349/86, 88; 445/24
See application file for complete search history.

(56) References Cited

U.S. PATENT DOCUMENTS

| | | | |
|---|---|---|---|
| 7,075,502 B1* | 7/2006 | Drzaic et al. | 345/55 |
| 7,161,732 B2* | 1/2007 | Kanbe | 359/296 |
| 7,345,810 B2* | 3/2008 | Chopra et al. | 359/296 |
| 7,548,291 B2* | 6/2009 | Lee et al. | 349/106 |
| 7,652,656 B2* | 1/2010 | Chopra et al. | 345/107 |
| 7,791,691 B2* | 9/2010 | Lee et al. | 349/106 |
| 8,040,594 B2* | 10/2011 | Paolini et al. | 359/296 |
| 2008/0273132 A1* | 11/2008 | Hsu et al. | 349/39 |
| 2010/0134407 A1* | 6/2010 | Wang et al. | 345/107 |
| 2012/0001842 A1* | 1/2012 | Stellbrink | 345/107 |

\* cited by examiner

*Primary Examiner* — Loha Ben
(74) *Attorney, Agent, or Firm* — Liu & Liu

(57) ABSTRACT

A system for displaying images is provided. The system includes a display device including a display device having a pixel unit array. Each pixel unit is constituted by a first sub-pixel and a second sub-pixel adjoined thereto. The first sub-pixel includes a plurality of first charged colored particles and a plurality of second charged colored particles to receive a light source that doesn't pass through a color filter. The second sub-pixel includes a plurality of third charged colored particles and a plurality of fourth charged colored particles to receive the light source. The pluralities of first, second, third, and fourth charged colored particles have at least three colors in total.

9 Claims, 4 Drawing Sheets

FULL COLOR ELECTROPHORETIC DISPLAY DEVICE

This application claims priority of Taiwan Patent Application No. 99115765, filed on May 18, 2010, the entirety of which is incorporated by reference herein.

BACKGROUND OF THE INVENTION

1. Field of the Invention

The invention relates to flat panel display (FPD) technology, and in particular to a full color electrophoretic display device with high brightness and high resolution.

2. Description of the Related Art

FPD devices are widely employed in electronic products, such as portable personal computers, personal digital assistants (PDAs), electronic books, projectors, mobile phones, and the like, due to their thin profiles, light weights and low power consumption when compared to conventional cathode ray tube (CRT) display devices. Such FPD devices include a liquid crystal display (LCD) device, an organic light-emitting display (OLED) device, and an electrophoretic display (EPD) device.

In these FPD devices, although the LCD and EPD devices are non self-emissive type display devices, the EPD devices have advantages of low power consumption, good flexibility, and good readability when compared to LCD devices, and therefore can be applied to paper-like displays, such as electronic books.

In one conventional full color EPD technology, an electrophoretic layer with a monochrome display (e.g., an electrophoretic layer including charged black and white particles) is employed and associated with the color filters, such that light passes through the color filters to transmit red, green, and blue light to corresponding pixel regions. In such a display device, however, ⅔ of the light may be absorbed by the color filters, such that the brightness of the full color display device is ⅓ times that of the monochrome display device. Moreover, three sub-pixels (i.e., red, green and blue sub-pixels) are required for each pixel, and therefore the resolution of the display device is reduced.

Accordingly, there exists a need in the art for development of an improved display device, capable of improving the brightness and resolution of the display devices.

BRIEF SUMMARY OF THE INVENTION

A detailed description is given in the following embodiments with reference to the accompanying drawings. Systems for displaying images are provided. An exemplary embodiment of a system for displaying images comprises a display device comprising a display device having a pixel unit array. Each pixel unit is constituted by a first sub-pixel and a second sub-pixel adjoined thereto. The first sub-pixel comprises a plurality of first charged colored particles and a plurality of second charged colored particles to receive a light source that doesn't pass through a color filter. The second sub-pixel comprises a plurality of third charged colored particles and a plurality of fourth charged colored particles to receive the light source. The pluralities of the first, second, third, and fourth charged colored particles have at least three colors in total.

Another exemplary embodiment of a system for displaying images comprises a display device comprising a display device having a pixel unit array. Each pixel unit is constituted by a single sub-pixel. The sub-pixel comprises a plurality of first charged colored particles, a plurality of second charged colored particles, and a plurality of third charged colored particles to receive a light source that doesn't pass through a color filter. The pluralities of the first, second, and third charged colored particles have different colors from each other.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The following description is of the best-contemplated mode of carrying out the invention. This description is provided for the purpose of illustrating the general principles of the invention and should not be taken in a limiting sense. The scope of the invention is best determined by reference to the appended claims.

Figure 1:
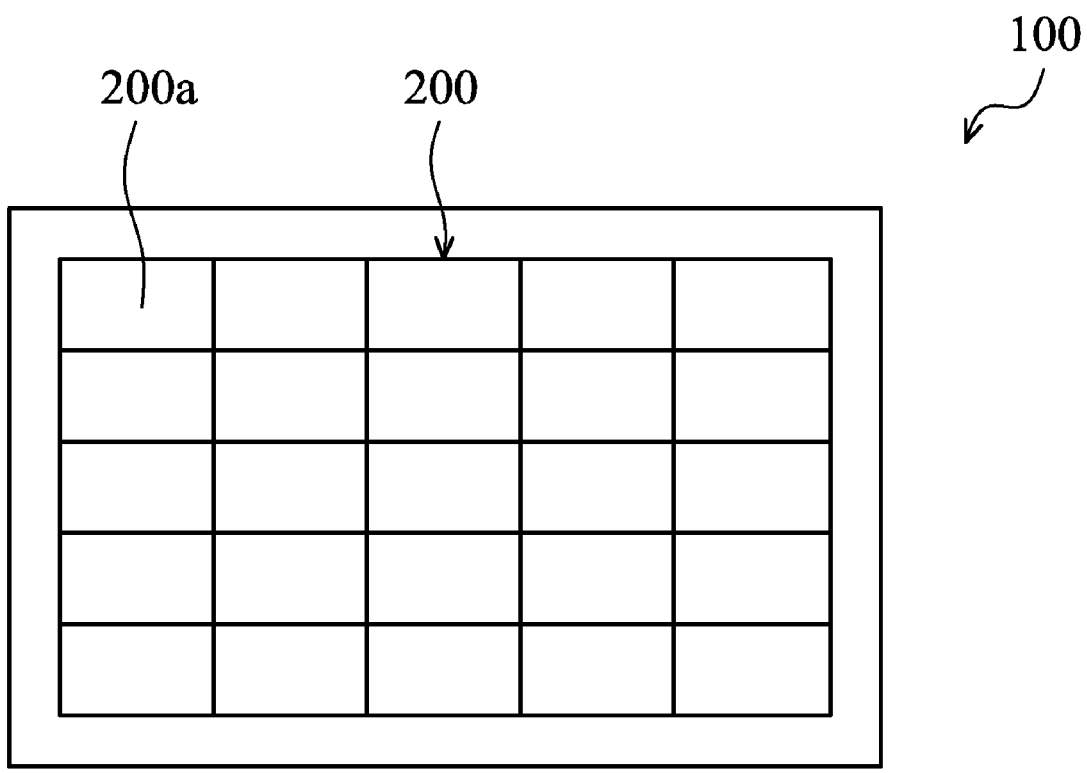
FIG. 1 is a plan view of an embodiment of a system for displaying images including a display device according to the invention.

Systems for displaying images are provided. Referring to FIG. 1, which is a plan view of an embodiment of a system for displaying images including a display device 100 according to the invention. In the embodiment, the display device 100 may be a full color EPD device and comprise a pixel unit array 200 constituted by a plurality of pixel units 200*a*.

Figure 2A:
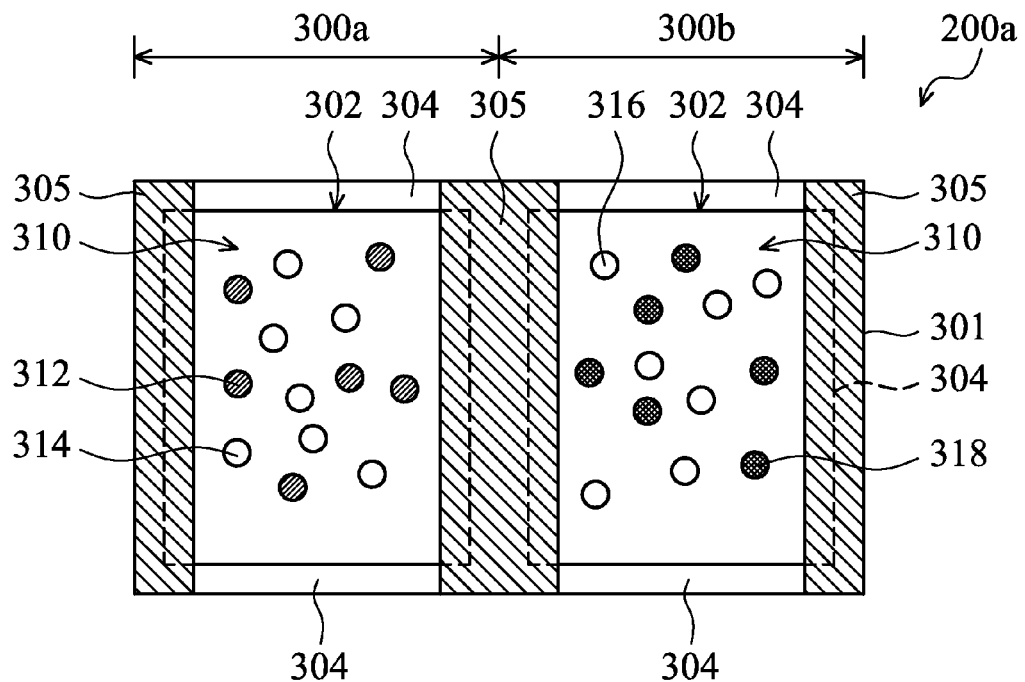
FIG. 2A is a plan view of an exemplary embodiment of a pixel unit shown in FIG. 1.
Figure 2B:
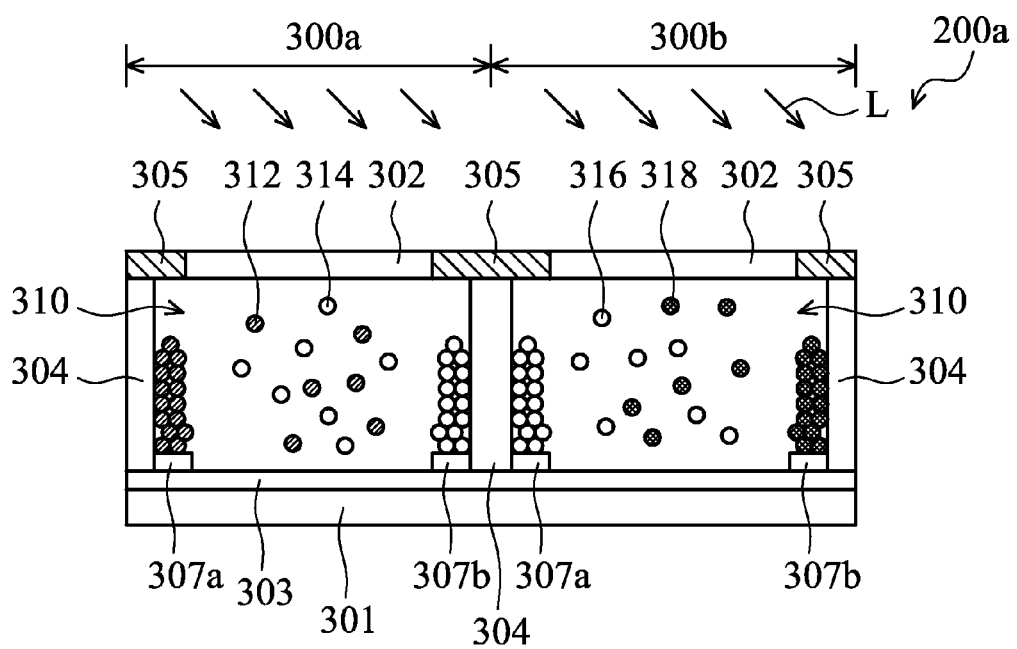
FIG. 2B is a cross section of a pixel unit shown in FIG. 2A.

Referring to FIGS. 2A and 2B, in which FIG. 2A is a plan view of an exemplary embodiment of a pixel unit 200*a* shown in FIG. 1 and FIG. 2B is a cross section of a pixel unit shown in FIG. 2A. Particularly, in the embodiment, each pixel unit 200*a* in the pixel unit array 200 may be constituted by a first sub-pixel 300*a* and a second sub-pixel 300*b* adjoined thereto. Note that the pixel unit 200*a* shown in FIG. 2A has an exemplary rectangular profile as viewed from a top-view perspective, although each pixel unit 200*a* may have other profiles as viewed from a top-view perspective, such as a triangular or hexagonal profile. Each pixel unit 200*a* may comprise a first substrate 301, a second substrate 302 and a plurality of EPD layers 310 formed between the first substrate 301 and second substrate 302, in which the first and second sub-pixels 300*a* and 300*b* correspond to one EPD layer, respectively. The first substrate 301 may comprise glass, quartz, plastic, or other flexible materials and may be transparent or opaque. The second substrate 302 may comprise glass, quartz, plastic, or other flexible materials and may be transparent.

In the embodiment, the EPD layer 310 may comprise charged colored particles spread in the solvent, liquid, or air, in which the charged colored particles are employed for receiving the light source L that doesn't pass through color filters. Namely, there is no color filter in the display device 100. For example, the EPD layer 310 corresponding to the first sub-pixel 300*a* may comprise a plurality of first charged colored particles 312 and a plurality of second charged colored particles 314 for receiving a light source L, while the EPD layer 310 corresponding to the second sub-pixel 300*b* may comprise a plurality of third charged colored particles 316 and a plurality of fourth charged colored particles 318 for receiving the light source L. In one embodiment, the pluralities of first, second, third, and fourth charged colored particles 312, 314, 316, and 318 may comprise dye or pigment, respectively, and have at least three colors in total. In one embodiment, the plurality of first charged colored particles 312 has a color which is the same as that of the plurality of third charged colored particles 316 and different from that of the plurality of fourth charged colored particles 318, while the plurality of second charged colored particles 314 has a color different from that of the pluralities of third and fourth charged colored particles 316 and 318. Moreover, the color of the plurality of first charged colored particles 312, the plurality of second charged colored particles 314 or the plurality of fourth charged colored particles 318 may be red, green or blue or the complementary color of the red, green or blue, such as magenta, cyan or yellow. For example, the pluralities of first and third charged colored particles 312 and 316 have a blue color, the plurality of second charged colored particles 314 has a red color, and the plurality of fourth charged colored particles 318 has a green color. In other embodiments, the pluralities of first, second, third, and fourth charged colored particles 312, 314, 316, and 318 have colors different from each other. For example, the plurality of first charged colored particles 312 has a red color, the plurality of second charged colored particles 314 has a blue color, the plurality of third charged colored particles 316 has a green color, and the plurality of fourth charged colored particles 318 has a magenta, cyan, yellow or black color. Additionally, the plurality of first charged colored particles 312 may have a polarity which is the same as or different from that of the plurality of the second charged colored particles 314, while the plurality of third charged colored particles 316 may have a polarity which is the same as or different from that of the plurality of the fourth charged colored particles 318. For example, the plurality of first charged colored particles 312 may have a positive polarity and the plurality of second charged colored particles 314 may have a negative polarity. Moreover, the plurality of third charged colored particles 316 may have a positive polarity and the plurality of fourth charged colored particles 318 may have a negative polarity. Additionally, the pluralities of first, second, third, and fourth charged colored particles 312, 314, 316, and 318 with different colors may have different charge amounts.

A reflection layer 303 is disposed between the first substrate 301 and the EPD layer 310 to reflect the light source L passing through the EPD layer 310 to the outside of the pixel unit 200a. The reflection layer 303 may comprise metal or other reflective materials well known in the art.

A spacer 304 is formed between the first substrate 301 and the second substrate 302 to separate each pixel unit 200a in the pixel unit array 200, while separating the EPD layers 310 in the first and second sub-pixels 300a and 300b of each pixel unit 200a, as shown in FIG. 2B. Moreover, a plurality of light-shielding layers 305 is formed on the second substrate 302 to cover the spacer 304 and portions of the EPD layers 310, thereby defining display regions (i.e., the regions uncovered by the plurality of light-shielding layers 305) and particle reservoir regions (i.e., the regions covered by the plurality of light-shielding layers 305) in the EPD layers 310 of the first and second sub-pixels 300a and 300b. For example, the plurality of light-shielding layers 305 is disposed on the opposing sides of the first sub-pixel 300a and the opposing sides of the second sub-pixel 300b, as shown in FIG. 2A. Electrodes 307a and 307b are disposed in the particle reservoir regions above the first substrate 301 and are respectively located at the opposing sides of the corresponding sub-pixels. In one embodiment, positive and negative voltages may be applied on the electrodes 307a and 307b, respectively, such that the plurality of charged colored particles with different colors in the EPD layer may be entirely concentrated in the corresponding particle reservoir regions or be entirely or partially transferred to the display region from the corresponding particle reservoir regions.

For example, the pluralities of first and third charged colored particles 312 and 316 have a blue color, the plurality of second charged colored particles 314 has a red color, and the plurality of fourth charged colored particles 318 has a green color. When the pixel unit 200a is operated under a white status, the pluralities of first, second, third, and fourth charged colored particles 312, 314, 316, and 318 are all located in the corresponding particle reservoir regions. When the pixel unit 200a is operated under a dark status, the pluralities of first, second, third, and fourth charged colored particles 312, 314, 316, and 318 are all located in the corresponding display regions. When the pixel unit 200a is operated under a red color display, the plurality of first charged colored particles 312 in the first sub-pixel 300a is located in the corresponding particle reservoir regions, while the plurality of second charged colored particles 314 in the first sub-pixel 300a is located in the display region. Moreover, the pluralities of third and fourth charged colored particles 316 and 318 in the second sub-pixel 300b are all located in the display region. The method for operating the pixel unit 200a under a green or blue color display may be similar as that under a red color display. Additionally, the ratio of the pluralities of charged colored particles in the display region and the particle reservoir regions in each sub-pixel can be adjusted if the pixel unit 200a is required to display gray levels or other colors except three primary colors. As a result, a full color display can be accomplished by each pixel unit without using any color filter.

According to the foregoing embodiments, since a full color display can be accomplished by each pixel unit without using any color filter, higher brightness can be obtained when compared to conventional display devices with color filters, while and manufacturing costs may be reduced. Moreover, since each pixel unit is constituted by only two sub-pixels, a higher resolution can be obtained when compared to conventional display devices in which each pixel unit is constituted by three sub-pixels.

Figure 3A:
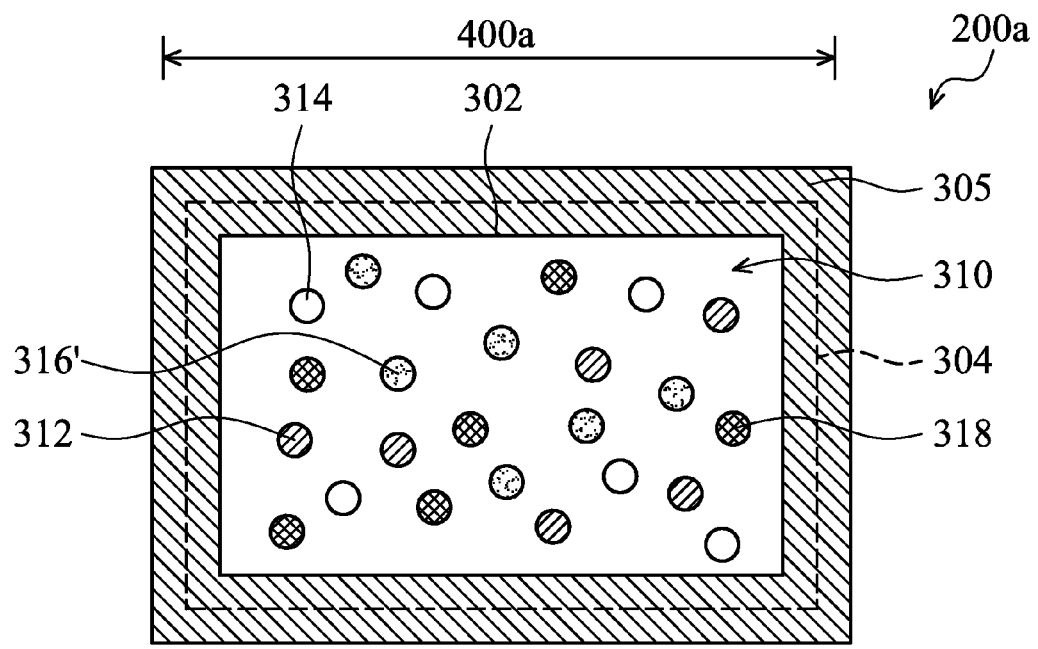
FIG. 3A is a plan view of another exemplary embodiment of a pixel unit shown in FIG. 1.
Figure 3B:
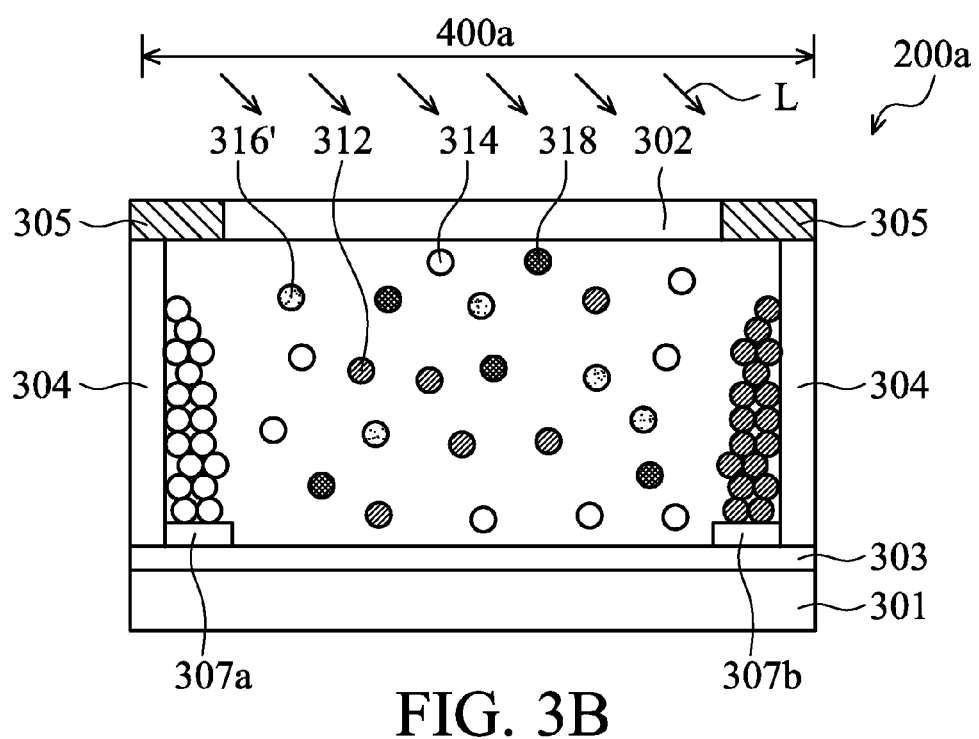
FIG. 3B is a cross section of a pixel unit shown in FIG. 3A.

Referring to FIGS. 3A and 3B, in which FIG. 3A is a plan view of another exemplary embodiment of a pixel unit 200a shown in FIG. 1 and FIG. 3B is a cross section of a pixel unit shown in FIG. 3A. Elements in FIGS. 3A and 3B that are the same as those in FIGS. 2A and 2B are labeled with the same reference numbers as in FIGS. 2A and 2B and are not described again for brevity. Particularly, in the embodiment, each pixel unit 200a in the pixel unit array 200 may be constituted by only one sub-pixel 400a. Also, note that the pixel unit 200a shown in FIG. 3A has an exemplary rectangular profile as viewed from a top-view perspective, although each pixel unit 200a may have other profiles as viewed from a top-view perspective, such as a triangular or hexagonal profile.

In one embodiment, the EPD layer 310 of the sub-pixel 400a may comprise a plurality of first charged colored particles 312, a plurality of second charged colored particles 314, and a plurality of third charged colored particles 316' for receiving a light source L that doesn't pass through color filters. The pluralities of first, second, and third charged colored particles 312, 314, and 316' may have different colors from each other. Moreover, the color of the plurality of first charged colored particles 312, the plurality of second charged colored particles 314 or the plurality of third charged colored particles 316' may be red, green, blue, magenta, cyan or yellow. For example, the plurality of first charged colored particles 312 has a red color, the plurality of second charged colored particles 314 has a green color, and the plurality of third charged colored particles 316' has a blue color. In another embodiment, the EPD layer 310 of the sub-pixel 400a may further comprise a plurality of fourth charged colored particles 318 having a color different from that of the pluralities of first, second, and third charged colored particles 312, 314, and 316' and comprise red, green, blue, magenta, cyan or yellow. Additionally, the pluralities of first, second, third, and fourth charged colored particles 312, 314, 316', and 318 may have the same or different polarities.

In the embodiment, the light-shielding layer 305 is formed on the spacer 304 and partially covers the EPD layers 310; thereby, defining a display region and particle reservoir regions in the EPD layers 310 of the sub-pixels 400a. For example, the light-shielding layer 305 is disposed on four edge sides of the rectangular sub-pixel 400a, as shown in FIG. 3A. In some embodiments, the light-shielding layer 305 may be disposed on three edge sides, four corners or three corners of the rectangular sub-pixel 400a, depending on the number of the required particle reservoir regions. The pluralities of charged colored particles with different colors typically have respective particle reservoir regions.

Moreover, in one embodiment, when the pixel unit 200a is operated under a white status, the pluralities of first, second, third, and fourth charged colored particles 312, 314, 316', and 318 are all located in the corresponding particle reservoir regions. When the pixel unit 200a is operated under the other color display, such as red color display, the plurality of charged red color particles or the pluralities of charged colored particles that can be mixed for a red color display may be located in the display region, while other pluralities of charged colored particles may be located in the corresponding particle reservoir regions. Additionally, the ratio of the pluralities of charged colored particles in the display region and the particle reservoir regions in the sub-pixel 400a can be adjusted if the pixel unit 200a is required to display gray levels. As a result, a full color display can be accomplished by each pixel unit without using any color filter.

According to the foregoing embodiments, the display device can have high brightness, and manufacturing costs may be reduced. Moreover, since each pixel unit is constituted by only one sub-pixel, resolution can be further improved.

Figure 4:
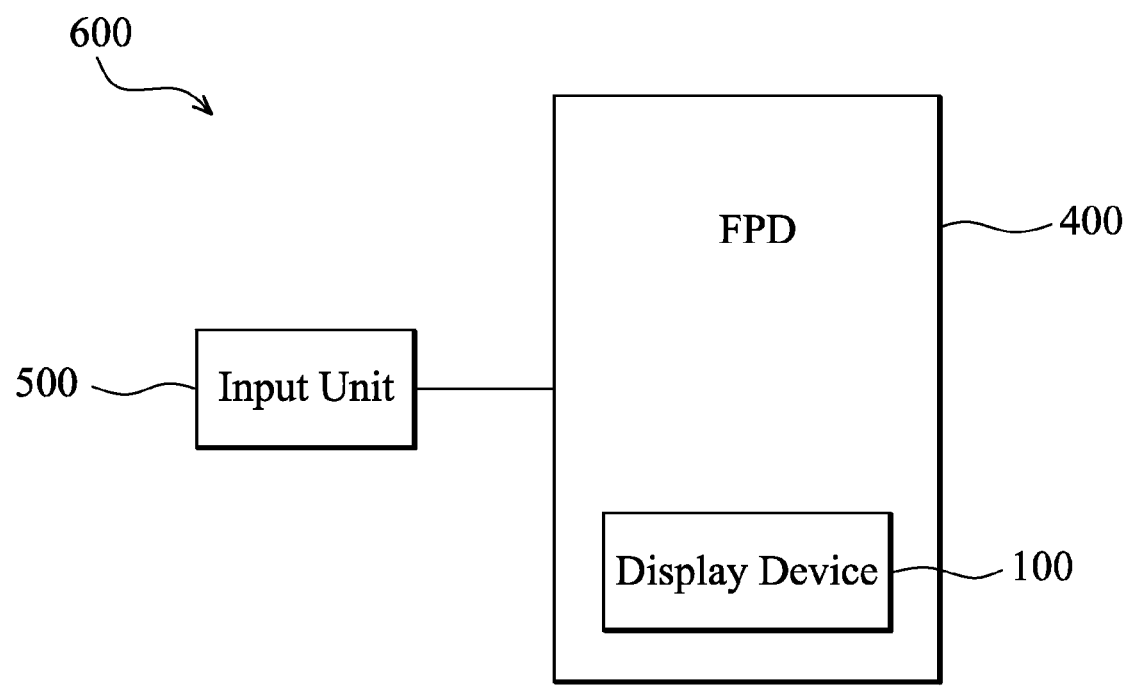
FIG. 4 schematically shows another embodiment of a system for displaying images.

FIG. 4 schematically shows another embodiment of a system for displaying images which, in this case, is implemented as a flat panel display (FPD) 400 or an electronic device 600 such as a projector, an electronic book, a laptop computer, a mobile phone, a digital camera, a personal digital assistant (PDA), a desktop computer, a television, a car display or a portable DVD player. The described display device 100 can be incorporated into the FPD 400 which can be an EPD. In some embodiments, the display device 100 can be incorporated into the electronic device 600. As shown in FIG. 4, the electronic device 600 comprises the FPD 400 and an input unit 500. Moreover, the input unit 500 is coupled to the FPD 400 and is operative to provide input signals (e.g. image signals) to the FPD 400 to generate images.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A system for displaying images, comprising:
a display device having a pixel unit array, wherein each pixel unit is constituted by a first sub-pixel and a second sub-pixel adjoined thereto,
wherein the first sub-pixel comprises a plurality of first charged colored particles and a plurality of second charged colored particles to receive a light source that doesn't pass through a color filter and the second sub-pixel comprises a plurality of third charged colored particles and a plurality of fourth charged colored particles to receive the light source, and
wherein the pluralities of first, second, third, and fourth charged colored particles have at least three colors in total.

2. The system of claim 1, wherein the plurality of first charged colored particles has a color which is the same as that of the plurality of third charged colored particles and different from that of the plurality of fourth charged colored particles, while the plurality of second charged colored particles has a color different from those of the pluralities of third and fourth charged colored particles.

3. The system of claim 2, wherein the plurality of first, second or third charged colored particles has a color of red, green, blue, magenta, cyan or yellow.

4. The system of claim 1, wherein the first and second sub-pixels each comprise an electrophoretic display layer comprising solvent, liquid, or air, such that the pluralities of first, second, third, and fourth charged colored particles are in the corresponding electrophoretic display layers.

5. The system of claim 4, wherein the display device further comprises a reflection layer disposed under the electrophoretic display layers to reflect the light source.

6. The system of claim 1, wherein the pluralities of first, second, third, and fourth charged colored particles comprise dye or pigment, respectively.

7. The system as claimed in claim 1, further comprising:
a flat panel display comprising the display device; and
an input unit coupled to the flat panel display and operative to provide input signals to the flat panel display, such that the flat panel display displays images.

8. The system of claim 7, wherein the system comprises an electronic device comprising the flat panel display.

9. The system of claim 8, wherein the electronic device is a projector, an electronic book, a laptop computer, a mobile phone, a digital camera, a personal digital assistant, a desktop computer, a television, a car display or a portable DVD player.

* * * * *